(12) United States Patent
Berning et al.

(10) Patent No.: US 8,590,983 B2
(45) Date of Patent: Nov. 26, 2013

(54) AUTOMOTIVE CONSTRUCTION MACHINE

(75) Inventors: Christian Berning, Zülpich (DE);
Thomas Kramer, Königswinter (DE);
Dieter Simons, Buchholz (DE); Günter Hähn, Königswinter (DE)

(73) Assignee: Wirtgen GmbH (DE)

( * ) Notice: Subject to any disclaimer, the term of this patent is extended or adjusted under 35 U.S.C. 154(b) by 818 days.

(21) Appl. No.: 12/081,505

(22) Filed: Apr. 17, 2008

(65) Prior Publication Data
US 2008/0258535 A1   Oct. 23, 2008

(30) Foreign Application Priority Data

Apr. 19, 2007   (DE) .................... 20 2007 005 756 U

(51) Int. Cl.
*E01C 23/088*   (2006.01)

(52) U.S. Cl.
USPC ........................................................ 299/39.4

(58) Field of Classification Search
USPC .......... 180/89.13–89.16; 296/190.01, 190.04, 296/190.05; 299/39.1, 39.4; 404/90, 93, 94
See application file for complete search history.

(56) References Cited

U.S. PATENT DOCUMENTS

| | | | |
|---|---|---|---|
| 3,182,605 A | | 5/1965 | Brasher |
| 3,431,016 A | * | 3/1969 | Eriksson et al. ......... 296/190.05 |
| 4,421,188 A | * | 12/1983 | Fredriksen .................... 180/327 |
| 4,819,738 A | | 4/1989 | Fountain |
| 5,086,869 A | * | 2/1992 | Newbery et al. .............. 180/329 |
| 5,190,398 A | | 3/1993 | Swisher, Jr. |
| 5,618,156 A | | 4/1997 | Brown |

(Continued)

FOREIGN PATENT DOCUMENTS

| | | |
|---|---|---|
| CA | 2 548 521 | 6/2005 |
| DE | 3128284 C2 | 12/1983 |

(Continued)

OTHER PUBLICATIONS

Exhibit A: Fernus, Claudia, Wirtgen GmbH, Windhagen, "Neuentwicklungen im Kalt-und Heissrecycling", Wissensportal baumaschine.de, 2(2004), 8 pp.

(Continued)

*Primary Examiner* — Sunil Singh
(74) *Attorney, Agent, or Firm* — Waddey & Patterson, P.C.; Lucian Wayne Beavers

(57) ABSTRACT

In an automotive construction machine, in particular road milling machine (1), recycler (100), or stabilizer, with a machine frame (4) carried by a chassis (2) with preferably vertically arranged lateral outer walls (5), a milling drum (6) mounted in the machine frame (4) for working a ground surface or traffic surface (8), and with an operator's platform (10) with an operating and indicating panel (12) and a seat (14) for a machine driver, it is provided that the operator's platform (10) is moveable on the machine frame (4) transversely to the direction of travel, that the seat (14) for the machine driver is integrated into the operator's platform (10), which is moveable outwards beyond the lateral outer walls (5) of the machine frame (4), that the machine frame (4) is provided with a guide (18) for the operator's platform (10) acting transversely to the direction of travel, and that the guide (18) projects laterally either not at all or just slightly beyond the outer walls (5).

23 Claims, 8 Drawing Sheets

(56) References Cited

U.S. PATENT DOCUMENTS

| | | | |
|---|---|---|---|
| 5,893,677 A | | 4/1999 | Haehn et al. |
| 6,039,141 A | * | 3/2000 | Denny .................... 180/329 |
| 7,204,546 B2 | * | 4/2007 | Antonetti ................ 296/190.04 |
| 7,441,625 B2 | | 10/2008 | Ackermann |
| 7,540,685 B2 | * | 6/2009 | Avikainen et al. ............. 404/83 |
| 7,594,562 B2 | * | 9/2009 | Heusinger .................. 180/327 |
| 2004/0021364 A1 | | 2/2004 | Busley et al. |
| 2006/0034661 A1 | | 2/2006 | Junga et al. |
| 2006/0202514 A1 | | 9/2006 | Antonetti |

FOREIGN PATENT DOCUMENTS

| | | | |
|---|---|---|---|
| DE | 9317225 U1 | | 2/1994 |
| DE | 19513551 C2 | | 5/1998 |
| DE | 29802858 U1 | | 5/1998 |
| DE | 29806492 U1 | | 8/1998 |
| DE | 19620072 C2 | | 2/2000 |
| DE | 10357074 B3 | | 5/2005 |
| EP | 0346802 A1 | | 12/1989 |
| EP | 0570753 A1 | | 11/1993 |
| EP | 0935025 B1 | | 4/2005 |
| FR | 1545123 | | 11/1968 |
| JP | 63013867 A | * | 1/1988 |
| JP | 07061287 A | | 3/1995 |
| JP | 11181832 | | 7/1999 |
| NL | 6919162 | | 6/1971 |
| WO | WO 8901435 A | * | 2/1989 |
| WO | 9624725 A1 | | 8/1996 |
| WO | 02064398 A1 | | 8/2002 |
| WO | 2004059088 A1 | | 7/2004 |

OTHER PUBLICATIONS

Exhibit B: Photos of Marini S.p.a. machine MF 1007, alleged to be introduced in the market in 1990.
Exhibit C: Machine translation of DE 196 20 072 A1.
Exhibit D: Machine translation of DE 31 28 284 A1.
Hamm Brochure, "DV Series—Think Forward", Hamm AG, (2004).
"World Highways", article entitled "'Revolutionary'driving concept" discussing Hamm DV Series (Mar. 2004).
Exhibit A: Office Action of Dec. 10, 2009 re Australian Patent Application No. 2008201640 (not prior art).
Sep. 16, 2011—English translation of Request for Cancellation, re German Utility Model 202007005756 (not prior art).
Feb. 24, 2012—Machine translation of patent owners response re German Utility Model 202007005756 (not prior art).
Aug. 7, 2012—German correspondence from cancellation petitioner with exhibit pp. 3 and 4, and machine translation thereof re German Utility Model 202007005756 (not prior art).
Sep. 7, 2012—Machine translation of patent owners response re German Utility Model 202007005756 (not prior art).
Oct. 11, 2012—German correspondence from cancellation petitioner and machine translation thereof re German Utility Model 202007005756 (not prior art).
Mar. 14, 2013—Machine translation of correspondence from cancellation petitioner re German Utility Model 202007005756 (not prior art).
E5: Product Presentation "Messepremiere neuer Walzengenerationen" (Exhibition debut of new generation of drums) in Wissensportal baumaschine.de 2 (2004).
E10: BOMAG Stabilizer/Recycler MPH 125 brochure and photographs as on the INTERMAT fair 2006.
E14: European Search Report of Jun. 16, 2011 in corresponding European Patent Application EP 08 154 152.6 (not prior art).
E15: Wirtgen Brochure—WR 2000 (2007).
E16: Declaration of Lutz Stallgies (not prior art).
E17: Declaration of Robert Laux (not prior art).
E18: BOMAG Press Release, Mar. 2006.
E19: BOMAG Intermat 2006.
E20: Examination Report for European Patent Application EP 1983106 A2 (not prior art).
E27: Machine translation of JP 11-181832.

* cited by examiner

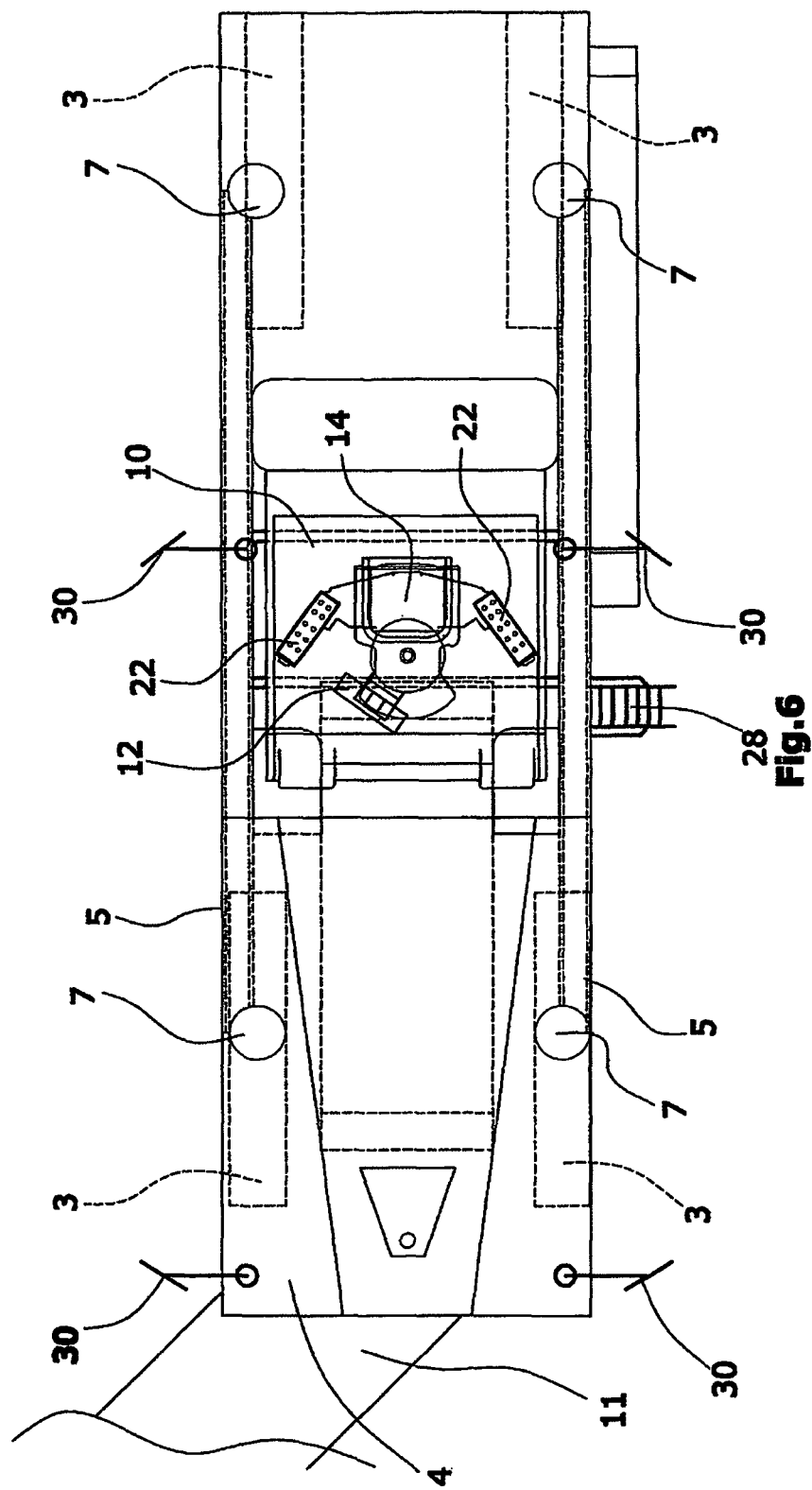

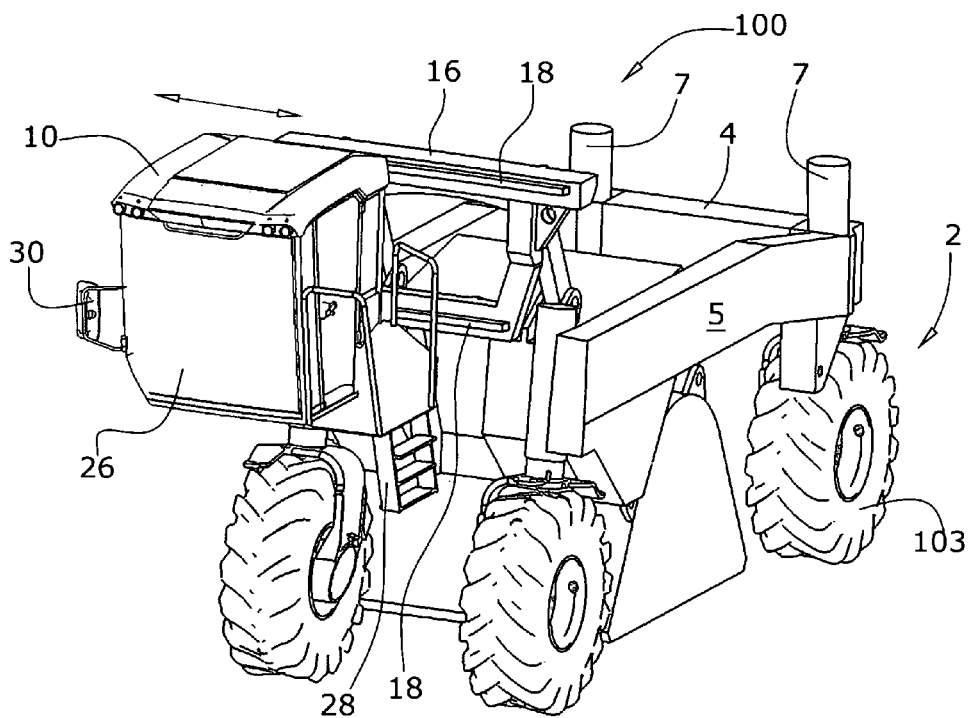
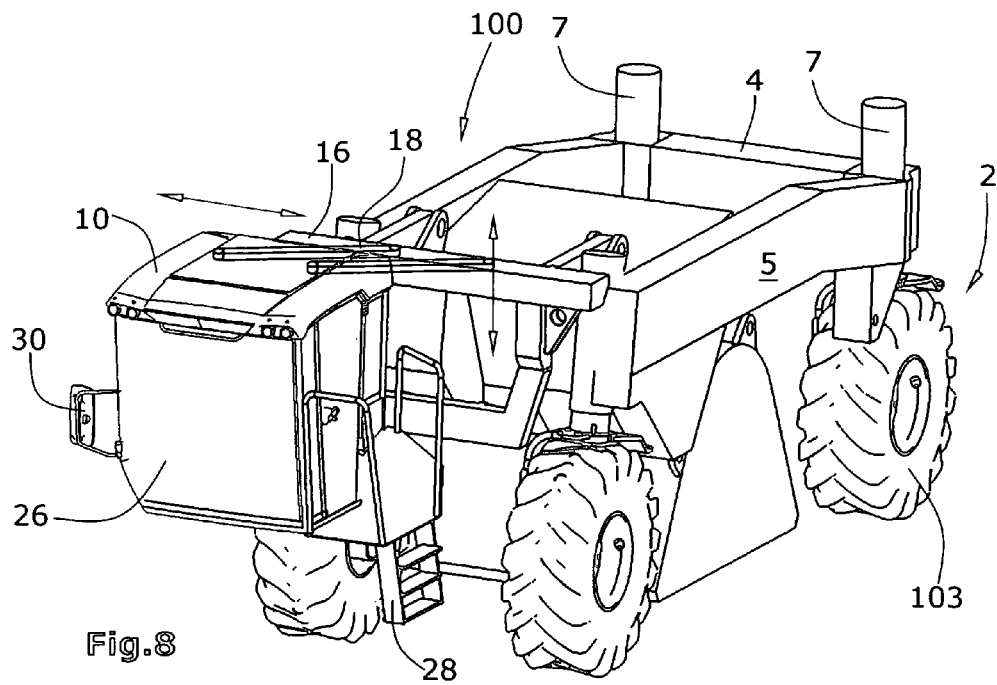

AUTOMOTIVE CONSTRUCTION MACHINE

SUMMARY OF THE INVENTION

The invention relates to an automotive construction machine, in particular road milling machine, recycler or a stabilizer.

Such road milling machines are known, for instance, from WO02/01005. Such a road milling machine is provided with a machine frame carried by a chassis, and has essentially vertically arranged lateral outer walls. A milling drum for working a ground surface or traffic surface is mounted inside the machine frame. The road milling machine is furthermore provided with an operator's platform with an operating and indicating panel, as well as a seat for the machine driver. A stabilizer is known from DE 103 57 074.

The machine driver has to turn around during reverse travel. The seat of the machine driver is preferably arranged on the so-called zero side of the road milling machine, being that side where the milling drum, with its front end, can be guided closest along an obstacle, for instance, the edge of a curb or a crash barrier.

On that side lying opposite of the zero side, the front end of the milling drum cannot be guided along an obstacle as closely due to the drive mechanism.

From his seat, which is arranged on the zero side, the machine driver can observe the outer edge of the machine lying opposite of the zero side by means of exterior mirrors.

Because of the restricted view and observation possibilities, the machine driver is dependent on an accompanying helper who will assist him in particular when in maneuvering mode and in milling mode. This will result in very long periods of time, however, in particular when in milling mode, in which the helper will not be occupied.

The purpose of the invention is, therefore, to further develop a construction machine of the type first mentioned above in such a manner that the visibility for the machine driver is improved, so that the operation of a construction machine is possible both in maneuvering mode and in working mode without additional helping persons.

BRIEF SUMMARY OF THE INVENTION

The invention provides in an advantageous manner that the operator's platform is moveable transversely to the direction of travel, and that the seat for the machine driver is integrated into the operator's platform, which is moveable outwards beyond the lateral outer walls of the machine frame, with the said machine frame being provided with a guide for the operator's platform acting transversely to the direction of travel, and the guide projecting either not at all or just slightly beyond the lateral outer walls. The operator's platform is capable of being moved beyond the lateral outer walls only partially, it being sufficient that the machine driver in the operator's platform can observe the lateral outer wall and the area next to the outer wall.

According to the invention, the machine driver can move beyond the lateral outer walls on both sides of the construction machine with his seat, so that he is able to optimally observe the outer walls of the machine in maneuvering and milling mode. In case of an obstacle, for instance, a streetlight, the machine driver can also briefly shift his operator's platform towards the center until the construction machine has passed the obstacle.

The operator's platform may be mounted to swivel around a vertical axis, at least in the outer limit positions of the at least one guide, when beyond the lateral outer walls. The machine driver can thus be brought into an optimal position for observation of the machine when in maneuvering and milling mode.

The operating and indicating panel is preferably integrated into the moveable operator's platform. In this way, the machine driver will not have to leave his seat for the purpose of operating the machine, or for reading indicating instruments.

An advantageous further development provides that a column attached at the moveable operator's platform carries the operating and indicating panel in an adjustable distance from the machine driver. In this way, the operating and indicating panel can be ergonomically adapted to each machine driver.

A preferred embodiment provides that the height of the seat surface of the seat, or the height of the standing surface in the operator's platform is adjustable in such a manner that the eye level when sitting essentially corresponds to the eye level of the machine driver when standing. In this way, it is ensured that the machine driver possesses the same overview of the machine when sitting as when standing.

The seat is provided with armrests, where operating elements for the machine's control may be arranged in extension of one armrest of the seat.

The operator's platform is preferably enclosed by a weather protection facility, which is capable of being moved in conjunction with the operator's platform.

The weather protection facility may consist of a cabin.

The cabin is preferably capable of being folded down or lowered or folded over for transport, so as to be able to keep the maximum transport dimensions of the road milling machine low for bridge underpasses when transporting on a low loader. The cabin is, for instance, capable of being folded around an axis running parallel to the direction of travel, if its width transverse to the direction of travel is significantly narrower than its height.

The operating and indicating panel is provided with control, operating and indicating elements for travelling and maneuvering mode, for milling mode, and for monitoring of the milling mode.

Ascending aids for the machine driver may be arranged at the lateral outer walls, the said ascending aids being capable of automatically swiveling into a position in which they rest close to the outer wall for the purpose of reducing the road milling machine's minimum distance from obstacles. These ascending aids, for instance, ladders with rails, may be placed against the outer wall of the road milling machine by means of electric or hydraulic remote control, without manual operation or assistance by helping persons, so that the road milling machine can be guided up to obstacles as closely as possible, in particular on the zero side.

Tilting mirrors may additionally be provided, which are capable of automatically swiveling into a position in which they project laterally either not at all or just slightly beyond the outer wall for the purpose of reducing the road milling machine's minimum distance from obstacles.

The operator's platform may be provided with a vertical swiveling axis that runs between the seat and the operating and indicating panel, and preferably centrally between the seat and the operating and indicating panel. In this way, the seat of the machine driver will effect a swiveling movement around the said vertical swiveling axis, which preferably runs orthogonally to the machine frame.

The seat of the machine driver may additionally be capable of swiveling either with the operator's platform or independent of the operator's platform, so that the reversing mode is also facilitated for the machine driver. Preferably, a swiveling angle of 180° is sufficient, with a larger rotation angle possibly being of advantage as well.

The swiveling movement around the vertical swiveling axis of the operator's platform is preferably only released in the outer limit positions of the seat unit at the ends of the rail guide.

It may be provided that the seat for the machine driver is capable of swiveling outwards automatically in the outer limit positions of the operator's platform at the ends of the rail guide. This means that the machine driver will not have to actuate any operating or control elements to reach an optimal sitting position for observation of the road surface to be worked, the steering angle, a gauge rod, and the markings on the road surface.

The seat or the operator's platform and/or the cabin may be capable of being raised into an elevated position for the traveling and maneuvering mode.

The operator's platform may be arranged in front of the machine frame and/or the chassis when seen in the direction of travel, in particular with a recycler or stabilizer.

The operator's platform may be attached in a moveable manner at a swivel frame of the machine frame, and may be capable of being raised or lowered by means of the swivel frame. In that case, the guide for the operator's platform, which runs transversely to the direction of travel, is arranged at the swivel frame of the machine frame.

The swivel frame is articulated at the machine frame preferably in a parallelogram-type manner, so that the operator's platform or the cabin respectively is shifted in parallel direction when raised or lowered.

It is preferably provided that the swivel frame projects vis-à-vis the operator's platform in height direction and/or transversely to the direction of travel in such a manner that it forms a rollover protection.

In the following, embodiments of the invention are explained in more detail with reference to the drawings.

BRIEF DESCRIPTION OF THE SEVERAL VIEWS OF THE DRAWINGS

FIG. 6 is a top view of the road milling machine in accordance with FIG. 5, where the cabin is in transport position.

FIGS. 7 and 8 are a perspective view of a stabilizer.

DETAILED DESCRIPTION OF THE INVENTION

Figure 1:
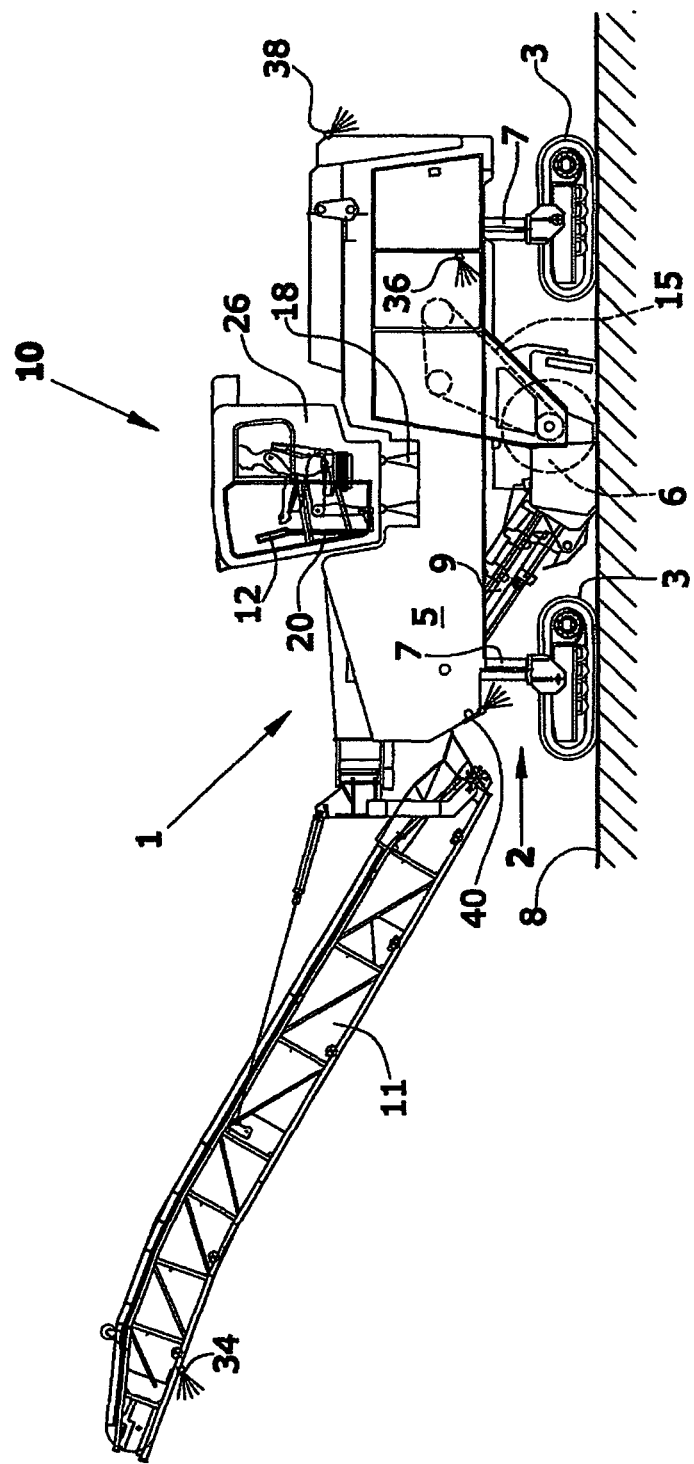
FIG. 1 is a road milling machine.
Figure 2:
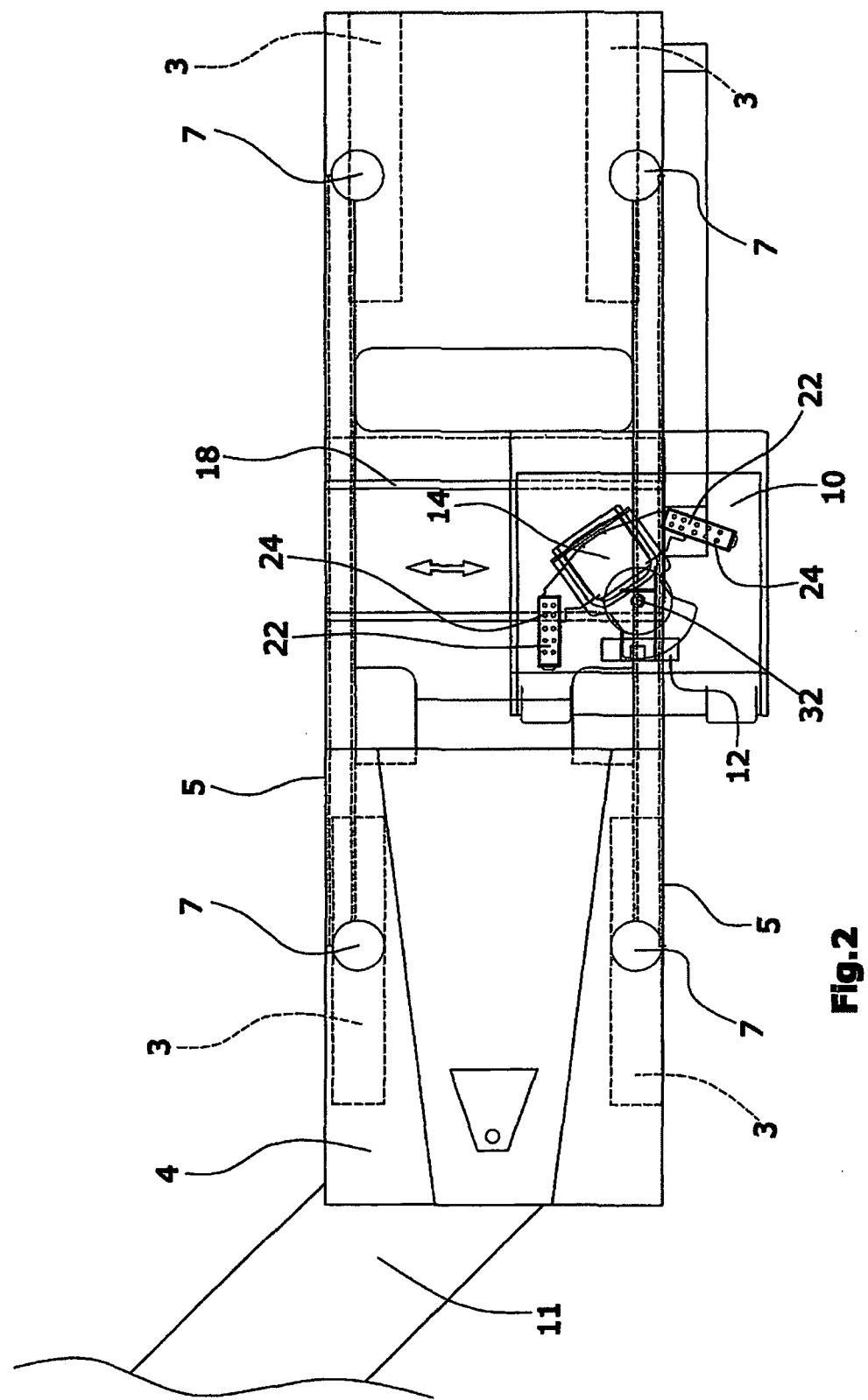
FIG. 2 is a top view of the road milling machine shown in FIG. 1.
Figure 3:
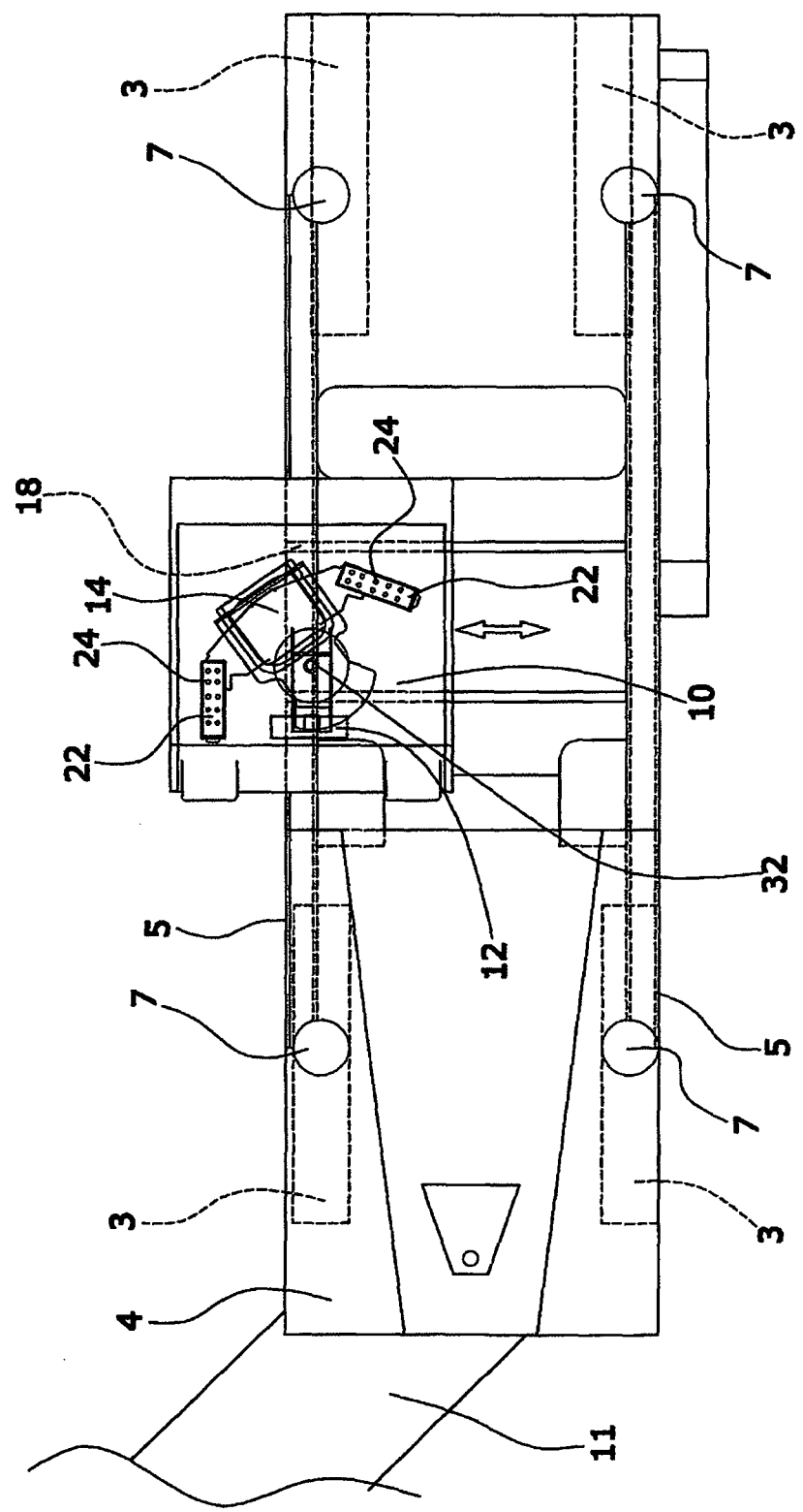
FIG. 3 is a further top view of the road milling machine shown in FIG. 1.
Figure 4:
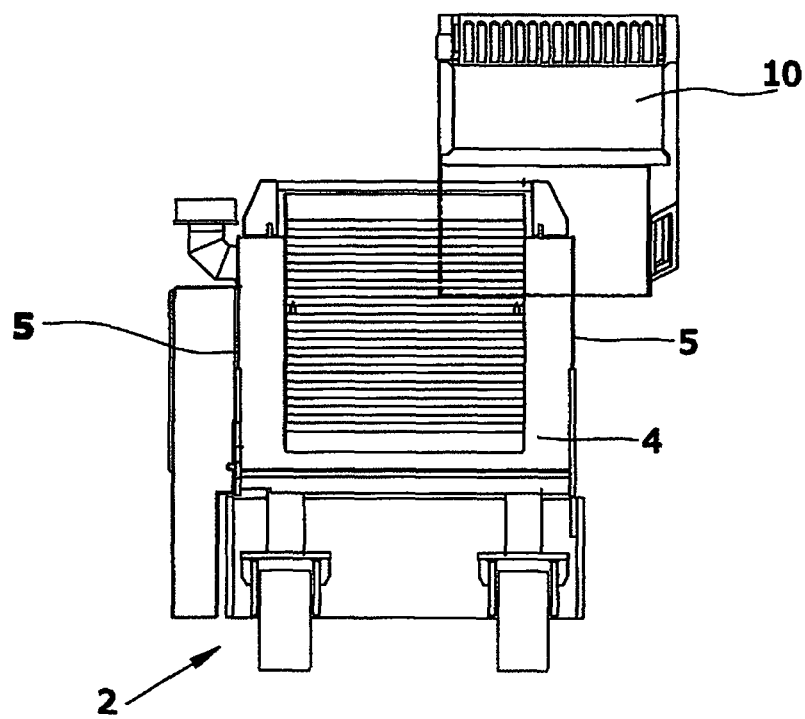
FIG. 4 is a rear view of the road milling machine shown in FIG. 1.
Figure 5:
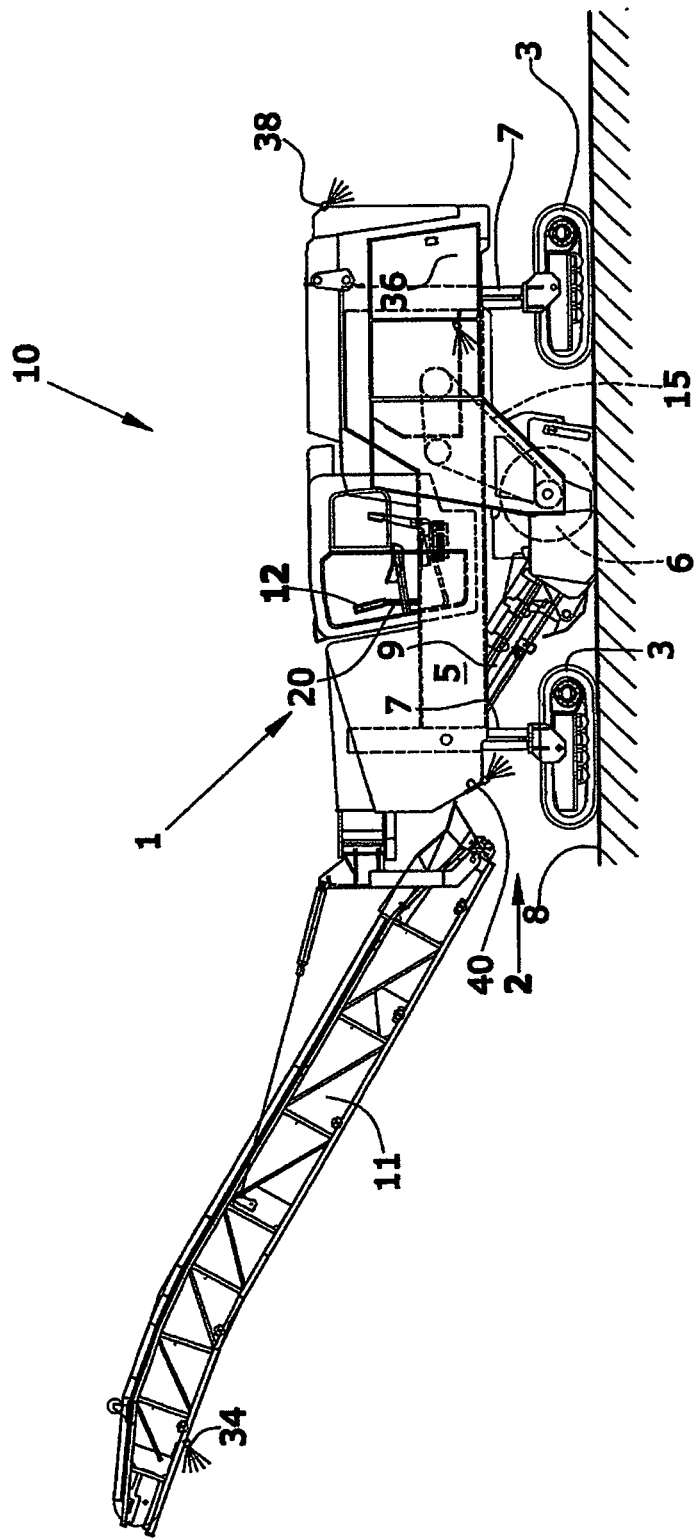
FIG. 5 is a side view of the road milling machine, where the cabin of the operator's platform is in transport position.
Figure 9:
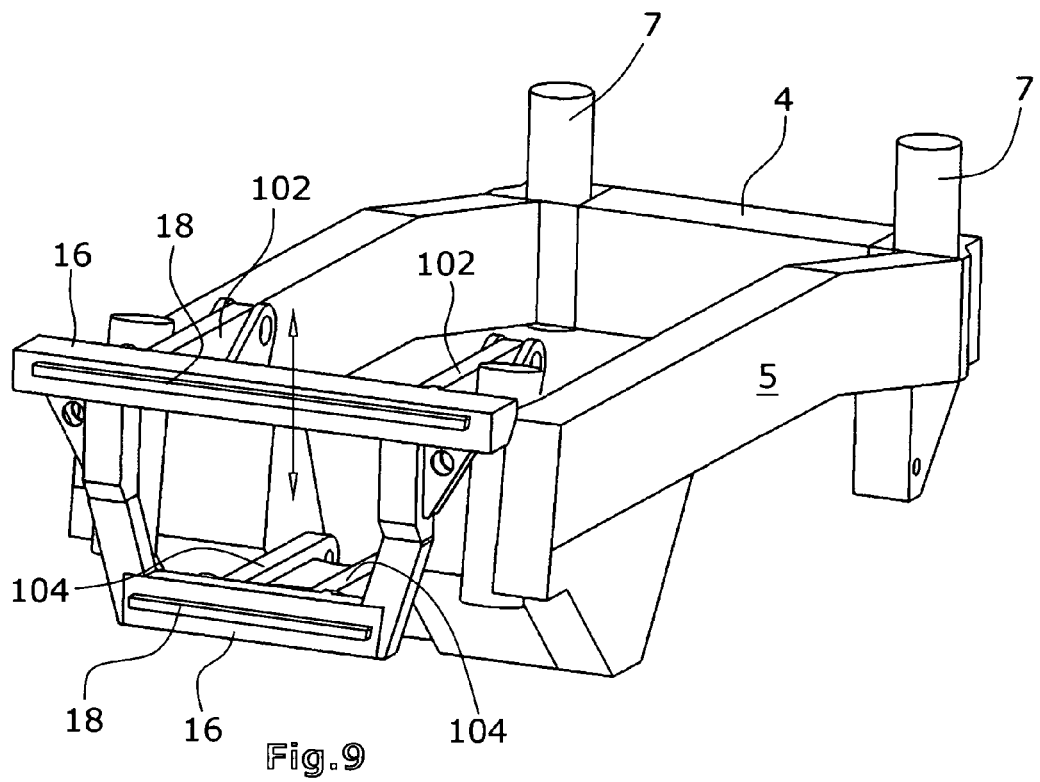
FIGS. 9 and 10 are a swivel frame of the machine frame of the stabilizer in accordance with FIGS. 7 and 8.

FIG. 1 shows a road milling machine 1 for milling ground surfaces or traffic surfaces 8 in the embodiment of a front-loading road milling machine. The road milling machine 1 is provided with a chassis 2 with, for example, four crawler track units 3, which carries the machine frame 4 of the road milling machine 1. It is understood that the crawler track units 3 may be substituted wholly or in part by wheel units. A milling drum 6, which extends transversely to the direction of travel, is mounted in the machine frame 4. The milling depth is preferably set by means of the height adjustment of the crawler track units 3 via lifting columns 7. The road milling machine 1 depicted in FIG. 1 is also called a front-loading road milling machine, as it is capable of conveying the milled material towards the front when seen in the direction of travel onto a transport vehicle. A first transport device 9, consisting of a transport conveyor, is arranged in front of the milling drum 6 when seen in the direction of travel, the said first transport device 9 transferring the milled material preferably to a second transport device 11 consisting of a transport conveyor. It is understood that the road milling machine 1 may also be provided with only one single transport conveyor. The machine frame 4 is provided with essentially vertically arranged lateral outer walls 5. An operator's platform 10 with an operating and indicating panel 12 and a seat 14 for the machine driver is arranged on the top side of the machine frame. The seat 14 and the operating and indicating panel 12 are integrated into the operator's platform 10, which is moveable transversely to the direction of travel. The operator's platform 10 can be moved outwards beyond the lateral outer walls 5 of the machine frame 4 on a guide 18, preferably a rail guide, which is connected to the machine frame 4. The rail guide 18 does preferably not project laterally beyond the outer walls 5, with the operator's platform 10 being nonetheless capable of being moved to nearly its center beyond the lateral outer walls 5, as can best be seen from FIGS. 2 and 3.

The guide 18 may run linearly or slightly curved in a horizontal plane essentially transverse to the direction of travel, or may consist of a parallel guide in which the operator's platform is shifted in a parallel manner.

The seat 14 for the machine driver is mounted to swivel. It is preferably provided that the seat 14 is capable of swiveling in conjunction with an operating and indicating panel 12 around a vertical axis 32 within the operator's platform 10.

The operating and indicating panel 12 integrated into the moveable operator's platform 10 is attached at a column 20 in an adjustable distance from the machine driver for that purpose, and is capable of swiveling around the vertical axis 32 with the seat 14 or independent of the same.

The seat 14 may be adjustable in height with regard to its seat surface in such a manner that the eye level of the machine driver when sitting essentially corresponds to the eye level when standing within the operator's platform 10.

The seat 14 may be provided with armrests 22, which are provided with the operating elements 24 for the machine's control.

The operator's platform 10 is enclosed by a cabin 26 serving as a weather protection facility. In central position of the cabin 26 between the outer walls 5, the cabin is capable of being lowered relative to the machine frame 4 in such a manner that the upper edge of the cabin 26 terminates flush with the machine elements arranged in front of and behind the cabin 26 and attached to the machine frame 4. The cabin 26 is thus in a transport position to keep the construction height low when transporting the road milling machine 1 on a low loader.

Alternatively, the cabin may be capable of folding down or capable of swiveling around a horizontal axis running parallel to the direction of travel if the cabin 26 is narrow in comparison to its height.

Ascending aids 28 in the form of ladders with hand rails may be arranged at the lateral outer walls 5, the said ascending aids 28 being capable of swiveling in the direction of the outer wall 5 by means of drives when the machine driver is in the operator's platform 10, so that they rest as closely as possible to the outer wall 5. The ascending aids are preferably arranged on that side of the road milling machine 1 that lies opposite of the zero side and on which the belt drive 15 for the milling drum 6 is also arranged.

It is understood, however, that the ascending aids may also be arranged on the zero side of the road milling machine 1. The zero side of the machine is that side on which the front end of the milling drum 6 ends in very close proximity to the outer wall 5 and on which the belt drive 15 is not arranged, so that milling close to edges or close to obstacles is possible on the zero side of the machine FIGS. 7 to 10 show a soil stabilizer/recycler 100. The machine frame 4 may be carried by a chassis 2 via lifting columns, the said chassis 2 preferably being provided with wheels 103. In such a construction machine, the operator's platform 10 is located in front of the machine frame 4 and also in front of the chassis 2. The operator's platform 10 enclosed by a cabin 26 can be seen in FIGS. 7 and 8, the said operator's platform 10 being connected to the machine frame 4 via a swivel frame 16 of the machine frame 4. The front part of the swivel frame 16 when seen in the direction of travel forms, at the same time, the guide 18 for the cabin 26 which is moveable transversely to the direction of travel.

An ascending aid 28 may be attached at the cabin 26.

FIG. 7 shows the swivel frame 16 of the machine frame 4, which is connected to the machine frame 4 in a parallelogram-type manner via control arms 102, 104.

Figure 10:
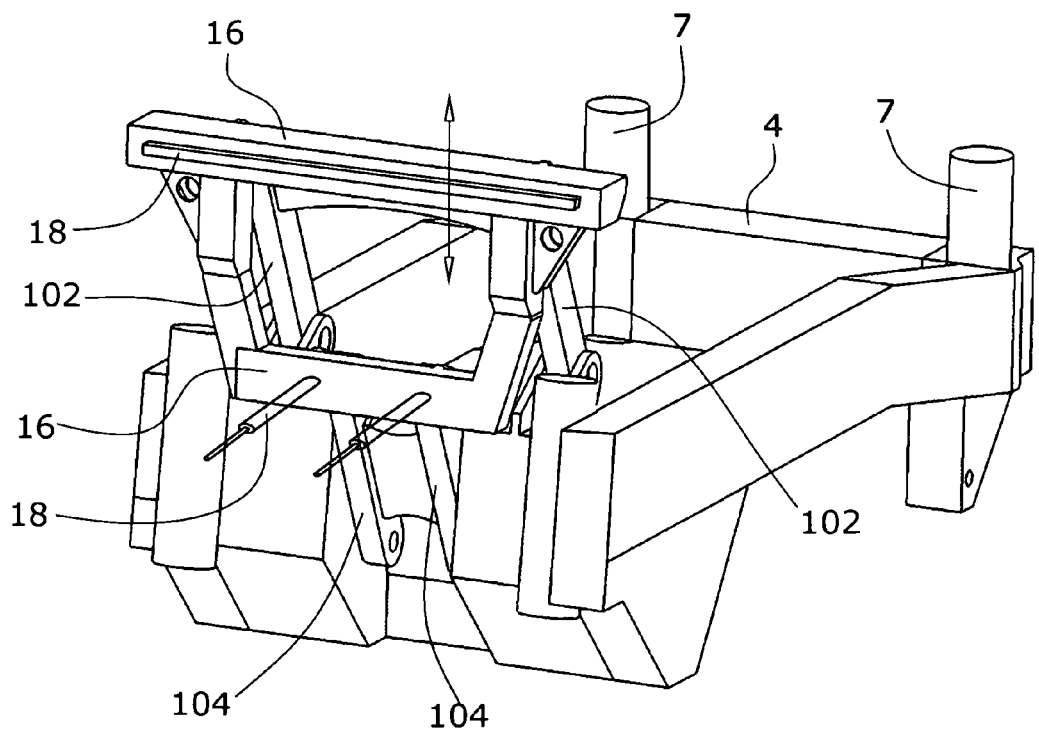

Because of the parallelogram-type articulation of the swivel frame 16, it is possible to shift the operator's platform 10 from a lower position to an upper position and back in a parallel manner without changing the inclination of the cabin 26 relative to a vertical plane that runs transversely to the direction of travel. The inclination may also be adjustable, however, through a suitable design of the parallelogram-type articulation or through additional devices 108 in longitudinal inclination and/or transverse inclination (FIG. 10).

On the swivel frame 16, guides 18 running parallel to the ground, linearly, or curved in a horizontal plane may be provided at the upper and/or lower cross beams of the swivel frame 16, the said guides 18 enabling the operator's platform 10 to be laterally shifted transversely to the direction of travel. FIG. 7 shows a maximum outer position of the operator's platform 10, in which the raised cabin 26 projects vis-à-vis the one lateral outer wall 5.

FIG. 8 shows an alternative guide 18 with control arms 110 arranged in a parallelogram-type manner, and a lowered cabin 26.

The upper cross beam of the swivel frame 16 extends across the full width of the machine frame 4 and may also project in height direction upwards beyond the roof of the cabin 26.

The swivel frame 16 may serve as rollover protection (Roll Over Protection Structure, ROPS).

Several tilting mirrors 30 may be arranged at the outer sides of the construction machines, in particular at the outer walls 5, the said mirrors 30 being suitable for operation by the machine driver by means of drive devices, so that additional persons are not required for these operations.

The cabin 26 may be moved into an especially elevated position for the maneuvering mode or the working mode.

Finally, video monitoring devices are arranged in several positions at the construction machine 1. A video camera 34 is located at the front end of the transport device 11 of the construction machine 1 shown in FIG. 2 for monitoring the discharge of material from the front transport conveyor 11 onto a means of transport, for instance, a truck.

A video camera 38 may be provided at the rear end of the construction machine 1 for monitoring the rearward area. Video cameras 36 may be arranged at the outer walls 5, which allow observation of the left or right machine side respectively in forward direction along the side walls 5. On the underside of the machine frame 4, a video camera 40 may be arranged at the front end of the machine frame 4, which can observe the area in front of the milling drum 6 of the construction machine 1.

As a result, the construction machines described can be operated by one machine driver without a helping person, as the machine driver can carry out all machine functions without being dependent on the assistance of a helping person, and without having to leave the operator's platform 10. Because of the video monitoring by means of the video cameras 34 to 40, and the display of the images on the operating and indicating panel 12, the transport of material onto a truck in case of a road milling machine, and the maneuvering mode when driving the construction machine 1 onto a low-loader, can also be carried out by the machine driver without a helping person.

Although a preferred embodiment of the invention has been specifically illustrated and described herein, it is to be understood that minor variations may be made in the apparatus without departing from the spirit and scope of the invention, as defined by the appended claims.

What is claimed is:

1. An automotive construction machine, comprising:
    a machine frame having a direction of travel, the frame having first and second lateral outer walls on opposite sides of the machine frame;
    a chassis supporting the machine frame from a ground surface;
    a milling drum supported from the machine frame for working the ground surface;
    a transverse guide located on the machine frame; and
    an operator's platform moveable on the transverse guide transversely to the direction of travel outward to first and second outer limit positions, in each of the outer limit positions the operator's platform overlying one of the lateral outer walls of the machine frame and extending only partially beyond said one of the lateral outer walls of the machine frame, the operator's platform being enclosed by a cabin, the platform having a seat for the machine driver located inside the cabin, the operator's platform and the cabin and the seat being moveable between a raised operating position and a lowered transport position, the operator's platform being mounted for swiveling movement about a vertical axis at least when in each of the outer limit positions.

2. The construction machine as defined in claim 1 wherein an operating and indicating panel is integrated into the moveable operator's platform.

3. The construction machine as defined in claim 2 wherein a column attached at the moveable operator's platform carries the operating and indicating panel in an adjustable distance from the machine driver.

4. The construction machine as defined in claim 1 wherein a height of a seat surface of the seat, or a height of a standing surface of the operator's platform is adjustable in such a manner that the eye level when sitting essentially corresponds to the eye level of the machine driver when standing.

5. The construction machine as defined in claim 1 wherein the seat is provided with armrests, and operating elements for the machine's control are arranged in at least one armrest of the seat.

6. The construction machine as defined in claim 1 wherein the operator's platform includes an operating and indicating panel provided with control, operating and indicating elements for the traveling mode, the milling mode, and for monitoring of the milling mode.

7. The construction machine as defined in claim 1 further comprising ascending aids for the machine driver arranged at the lateral outer walls, the ascending aids being capable of automatically swiveling into a position in which they rest close to the outer walls for the purpose of reducing the machine's minimum distance from obstacles.

8. The construction machine as defined in claim 1 further comprising tilting mirrors which, when traveling along lateral obstacles, are capable of automatically swiveling into a position in which they project laterally either not at all or just slightly beyond the outer walls for the purpose of reducing the machine's minimum distance from obstacles.

9. The construction machine as defined in claim 1 wherein the seat and an operating and indicating panel are pivotal about a vertical swiveling axis located centrally between the seat and the operating and indicating panel.

10. The construction machine as defined in claim 1 wherein the seat is capable of swiveling within the operator's platform and independent of the operator's platform.

11. The construction machine as defined in claim 1 wherein the swiveling movement of the operator's platform is released only in the outer limit positions of the operator's platform.

12. The construction machine as defined in claim 10 wherein the seat for the machine driver is capable of swiveling outwards automatically in the outer limit positions of the operator's platform.

13. The construction machine as defined in claim 1 further comprising video cameras for monitoring the discharge of material from a front transport conveyor onto a means of transport, for monitoring an area next to the outer walls, for monitoring a rearward area, and/or for monitoring an area in front of the milling drum.

14. The construction machine as defined in claim 1 wherein the construction machine is a stabilizer or recycler and the operator's platform is arranged in front of the machine frame and/or the chassis when seen in the direction of travel.

15. The construction machine as defined in claim 14 wherein the operator's platform is adjustable with regard to longitudinal and/or transverse inclination.

16. The construction machine as defined in claim 1 wherein the operator's platform is attached in a moveable manner at a swivel frame of the machine frame, and is capable of being raised and lowered by means of the swivel frame.

17. The construction machine as defined in claim 16 wherein the transverse guide for the operator's platform is arranged at the swivel frame of the machine frame.

18. The construction machine as defined in claim 16 wherein the swivel frame is articulated at the machine frame in a parallelogram-type manner.

19. The construction machine as defined in claim 16 wherein the swivel frame projects vis-à-vis the operator's platform in height direction and/or transversely to the direction of travel in such a manner that the swivel frame forms a rollover protection.

20. The construction machine as defined in claim 1, wherein:
   the cabin in its lowered transport position has an upper edge terminating substantially flush with elements of the construction machine arranged in front of and behind the cabin.

21. The construction machine as defined in claim 1, wherein:
   the cabin folds down around a horizontal axis.

22. The construction machine as defined in claim 1, wherein:
   the enclosed cabin provides a weather protection facility moveable in conjunction with the operator's platform.

23. The construction machine as defined in claim 1, wherein:
   for the purpose of transport, the cabin is capable of folding around a horizontal axis running parallel to the direction of travel.

* * * * *